UNITED STATES PATENT OFFICE.

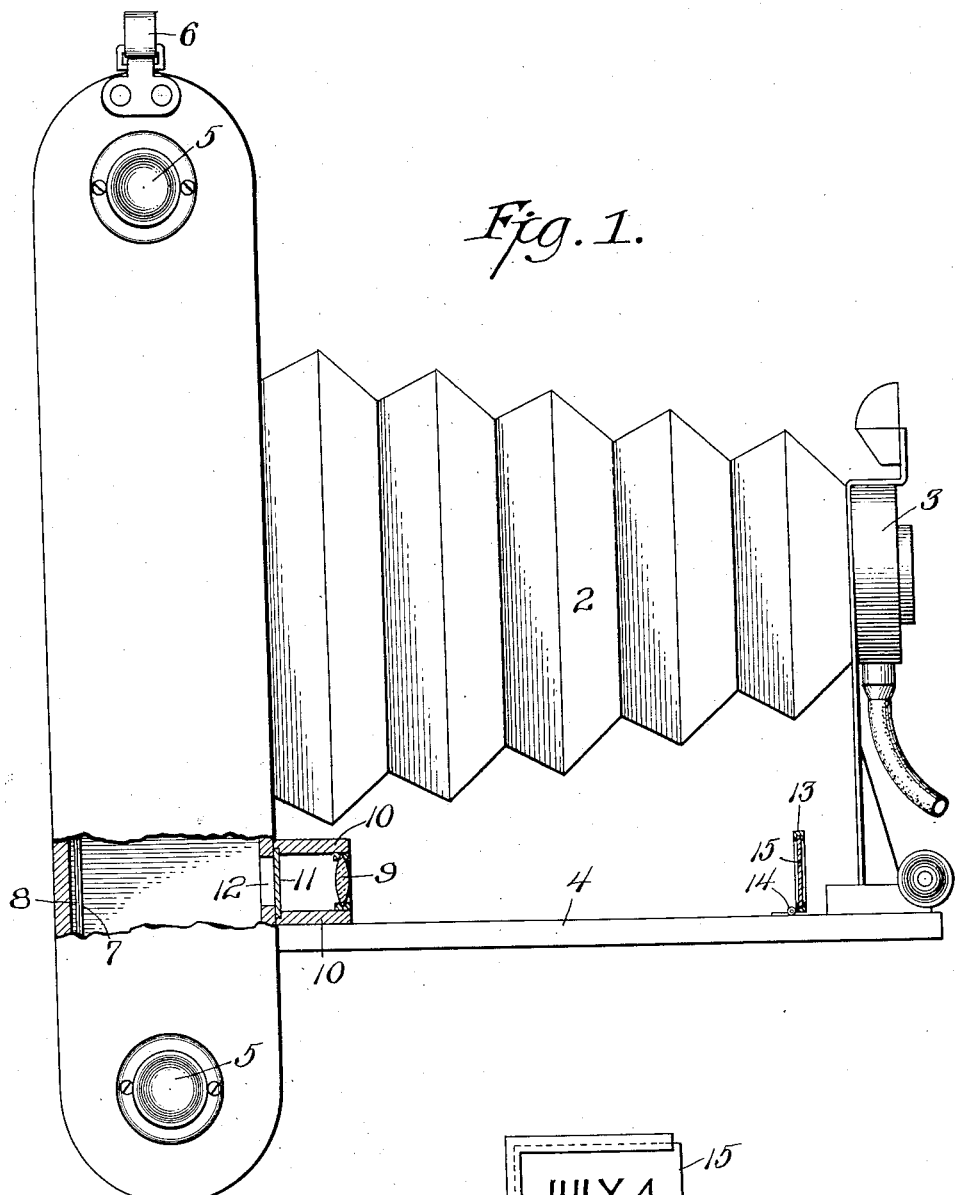

LEWIS L. CLARKE, OF NEW YORK, N. Y.

CAMERA.

1,132,070.  Specification of Letters Patent.  Patented Mar. 16, 1915.

Application filed August 19, 1914. Serial No. 857,435.

*To all whom it may concern:*

Be it known that I, LEWIS L. CLARKE, a citizen of the United States, and a resident of the borough of Manhattan, city, county, and State of New York, have invented certain new and useful Improvements in Cameras, of which the following is a specification, reference being had to the accompanying drawings.

It is the object of this invention to provide devices whereby a record or data may be produced upon the sensitive film adjacent to each exposure, either upon the edge, end or one corner of the exposure, as may be desired.

In the drawings Figure 1 is an elevation of a camera, partly broken away and partly in section, embodying my invention; Fig. 2 is a detail showing the surface bearing the data which is to be produced as a record upon the film.

In the drawings 1 represents the side of an ordinary folding camera, 2 the bellows, 3 the lens casing, 4 the drop front, 5, 5, the spool centers, 6 the handle, 7 the sensitized film, 8 the black paper for the film.

9 is a small short focus lens set in a casing 10. It is provided with a slide 11 and an exposure opening 12 which is in registration with the part of the film upon which it is desired the record shall be made. In the example shown the matter to be recorded will be produced in the blank space between adjoining negatives or in one corner of the negative.

13 (see Fig. 2) is a frame, preferably hinged, as at 14, to the drop front 4 and adapted to receive a card or similar article 15 as shown, upon which the writing 17 composing the matter to be recorded may be produced.

It will of course be understood that all joints between the bellows and the body of the camera are made light tight as usual and also that all joints between the supplemental casing and the adjoining parts are made light tight in order that no part of the sensitive surface be light struck. Any suitable device for accomplishing this light-tightness, many of which are now well known to this art, may be employed. Their special construction will depend upon the preference of the maker and also to some degree upon the shape and size of the casing 10 for the supplemental lens.

The operation is as follows: The exposure having been made, the operator writes upon the card 15 such data or matter as he desires to be recorded and places the card in the frame 13. Thereupon the slide 11 being drawn for such length of time as may be necessary, the writing on the card is photographed through the lens 9 upon the side or in the corner of the exposure as the case may be, in a manner well understood, which upon development will appear on the negative.

It will be understood by those who are familiar with this art that the construction illustrated and described herein is one form only of many in which the invention may be embodied and that it is adapted to use in many forms of camera other than the folding film-roll camera illustrated. I therefor do not limit myself to the details shown and described.

I claim:

1. A folding camera having in addition to the lens which registers with the field of the camera, a supplemental lens which registers with a part of the sensitive surface, a separate dark slide for the supplemental lens and means upon the folding part of the camera to support the subject to be photographed by the supplemental lens.

2. A folding camera having in addition to the lens which registers with the field of the camera, a supplemental lens which registers with a part of the sensitive surface, a hinged frame on the folding part of the camera for the support of the matter to be photographed by the supplemental lens and a separate dark slide for the supplemental lens.

In testimony whereof I have signed my name to this specification in the presence of two subscribing witnesses.

LEWIS L. CLARKE.

Witnesses:
HARRY SERENBETZ,
ROY MURCHIE.